(12) United States Patent
Yagi

(10) Patent No.: US 12,487,575 B2
(45) Date of Patent: Dec. 2, 2025

(54) CONTROL DEVICE FOR INDUSTRIAL MACHINE

(71) Applicant: FANUC CORPORATION, Yamanashi (JP)

(72) Inventor: Jun Yagi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 363 days.

(21) Appl. No.: 18/256,614

(22) PCT Filed: Feb. 10, 2022

(86) PCT No.: PCT/JP2022/005494
§ 371 (c)(1),
(2) Date: Jun. 8, 2023

(87) PCT Pub. No.: WO2022/176784
PCT Pub. Date: Aug. 25, 2022

(65) Prior Publication Data
US 2024/0045396 A1 Feb. 8, 2024

(30) Foreign Application Priority Data
Feb. 17, 2021 (JP) ................................ 2021-023437

(51) Int. Cl.
*G05B 19/402* (2006.01)
(52) U.S. Cl.
CPC .. *G05B 19/402* (2013.01); *G05B 2219/42249* (2013.01)
(58) Field of Classification Search
CPC ........ G05B 19/402; G05B 2219/42249; G05B 2219/50103; G05B 2219/50109; G05B 19/4067; G05B 19/416
See application file for complete search history.

(56) References Cited

U.S. PATENT DOCUMENTS 11,209,797 B2* 12/2021 Mikado ............... G05B 19/4062
2016/0062998 A1* 3/2016 Spehr ................. G06F 16/24554
707/748

FOREIGN PATENT DOCUMENTS

JP H02-259911 A 10/1990
JP H08-263121 A 10/1996
(Continued)

OTHER PUBLICATIONS

International Search Report issued in PCT/JP2022/005494; mailed May 10, 2022.

*Primary Examiner* — Mohammad Ali
*Assistant Examiner* — Sheela Rao
(74) *Attorney, Agent, or Firm* — Studebaker Brackett PLLC

(57) ABSTRACT

A control device is provided with an instructed path generation unit that generates an instructed path for a movement path of a moving part on the basis of an instruction of a program, an actual forward path prediction unit that predicts an actual forward path from the instructed path using a machine model relating to a transfer characteristic of an industrial machine, an instructed reverse path generation unit that generates an instructed reverse path by reversing the movement direction of an actual forward path, an actual reverse path prediction unit that predicts an actual reverse path from the instructed reverse path using the machine model, and an instructed speed adjustment unit that adjusts an instructed speed based on a movement speed indicated by the instruction of the program so as to reduce an error of the actual reverse path relative to the instructed reverse path, and generates an instructed reverse speed.

7 Claims, 7 Drawing Sheets

(56) References Cited

FOREIGN PATENT DOCUMENTS

| JP | 2014-078102 A | 5/2014 |
|----|---------------|--------|
| JP | 2016-048512 A | 4/2016 |

\* cited by examiner

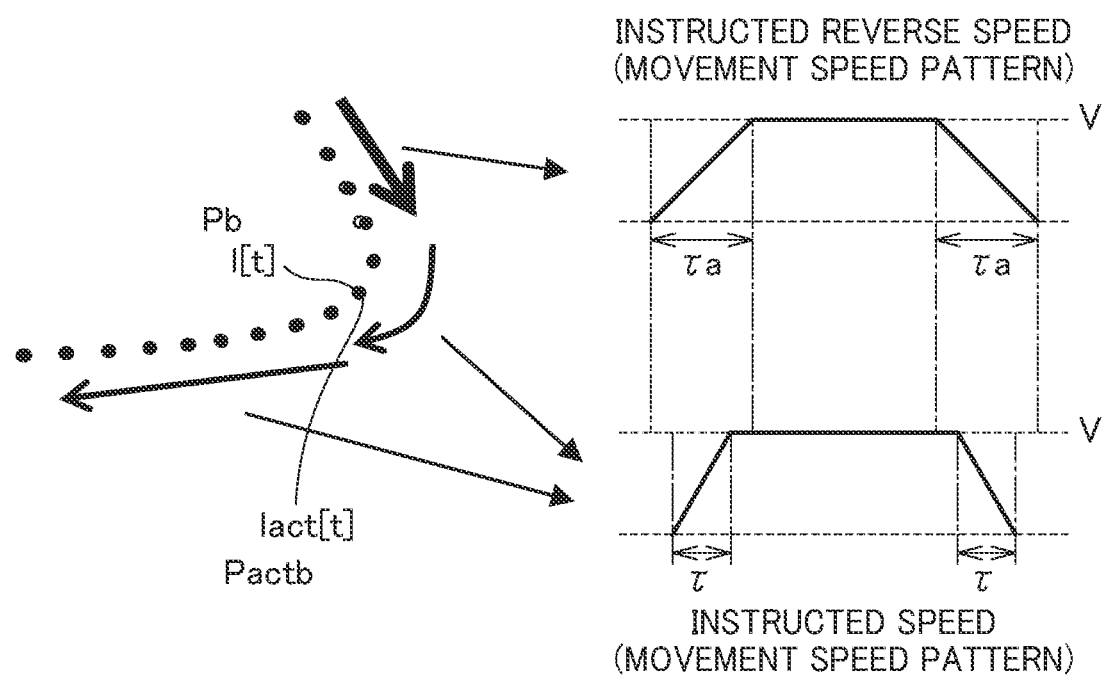

CONTROL DEVICE FOR INDUSTRIAL MACHINE

TECHNICAL FIELD

The present invention relates to a control apparatus for an industrial machine.

BACKGROUND ART

There is known a technique in which, when some problem occurs at the time of causing a movable unit to move along as instructed path, a control apparatus for an industrial machine such as a machine tool or a robot, returns the movable unit by causing the movable unit to reversely move along the instructed path (see, for example, Patent Document 1).

Patent Document 1: Japanese Unexamined Patent Application, Publication No. H2-259911

DISCLOSURE OF THE INVENTION

Problems to be Solved by the Invention

For example, if the above problem is insufficient machining, it is conceivable to, after returning the movable unit by causing the movable unit to reversely move along the instructed path, cause the movable unit to move along the instructed path again and perform machining. In this case, if an actual forward path along the instructed path and an actual reverse path for reversely moving along the instructed path are the same, the actual forward path and actual reverse path being an actual path that the movable unit actually pass through, it is possible to perform machining at the time of causing the movable unit to reversely move along the instructed path and improve the machining efficiency.

If the instructed path includes a non-linear path, and an instructed speed is relatively fast, however, the actual path may deviate from the instructed path at the non-linear path. More specifically, the actual path takes a detour in comparison with the instructed path. In this case, the actual forward path and the actual reverse path may deviate from each other because a detour position on the actual forward bath differs from a detour position on the actual reverse path are different at the non-linear path.

Therefore, a control apparatus for an industrial machine is desired which is capable of reducing the deviation between the actual forward path and the actual reverse path of the movable unit.

Means for Solving the Problems

A control apparatus for an industrial machine according to the present disclosure is a control apparatus for controlling movement of a movable unit of an industrial machine based on a program, the program including, for each block, an instruction about a movement path of the movable unit and an instruction about a movement speed of the movable unit. The control apparatus includes: an instructed path generation unit configured to generate an instructed path for the movement path of the movable unit based on an instruction from the program; a drive control unit configured to control a drive unit that drives the movable unit, the drive control unit being capable of performing forward movement operation of causing the movable unit to move along the instructed path, based on the instructed path generated by the instructed path generation unit and an instructed speed based on the movement speed indicated by the instruction from the program, and reverse movement operation of causing the movable unit to reversely move along the instructed path, based on an instructed reverse path and an instructed reverse speed; an actual forward path prediction unit configured to predict an actual forward path from the instructed path, using a machine model associated with a transfer characteristic of the industrial machine; an instructed reverse path generation unit configured to generate the instructed reverse path by reversing a movement direction of the actual forward path; an actual reverse path prediction unit configured to predict an actual reverse path from the instructed reverse path, using the machine model; and an instructed speed adjustment unit configured to adjust an instructed speed based on the movement speed indicated by the instruction from the program so as to reduce an error of the actual reverse path with respect to the instructed reverse path, and generate the instructed reverse speed.

Effects of the Invention

According to the present disclosure, it is possible to reduce a deviation between an actual forward path and an actual reverse path of the drive unit of the industrial machine.

BRIEF DESCRIPTION OF THE DRAWINGS

FIG. 30 is a diagram showing an example of the actual forward path in the non-linear part. A in FIG. 1A;

FIG. 4C is a diagram showing an example of an instructed reverse speed of the present embodiment;

PREFERRED MODE FOR CARRYING OUT THE INVENTION

Figure 1:
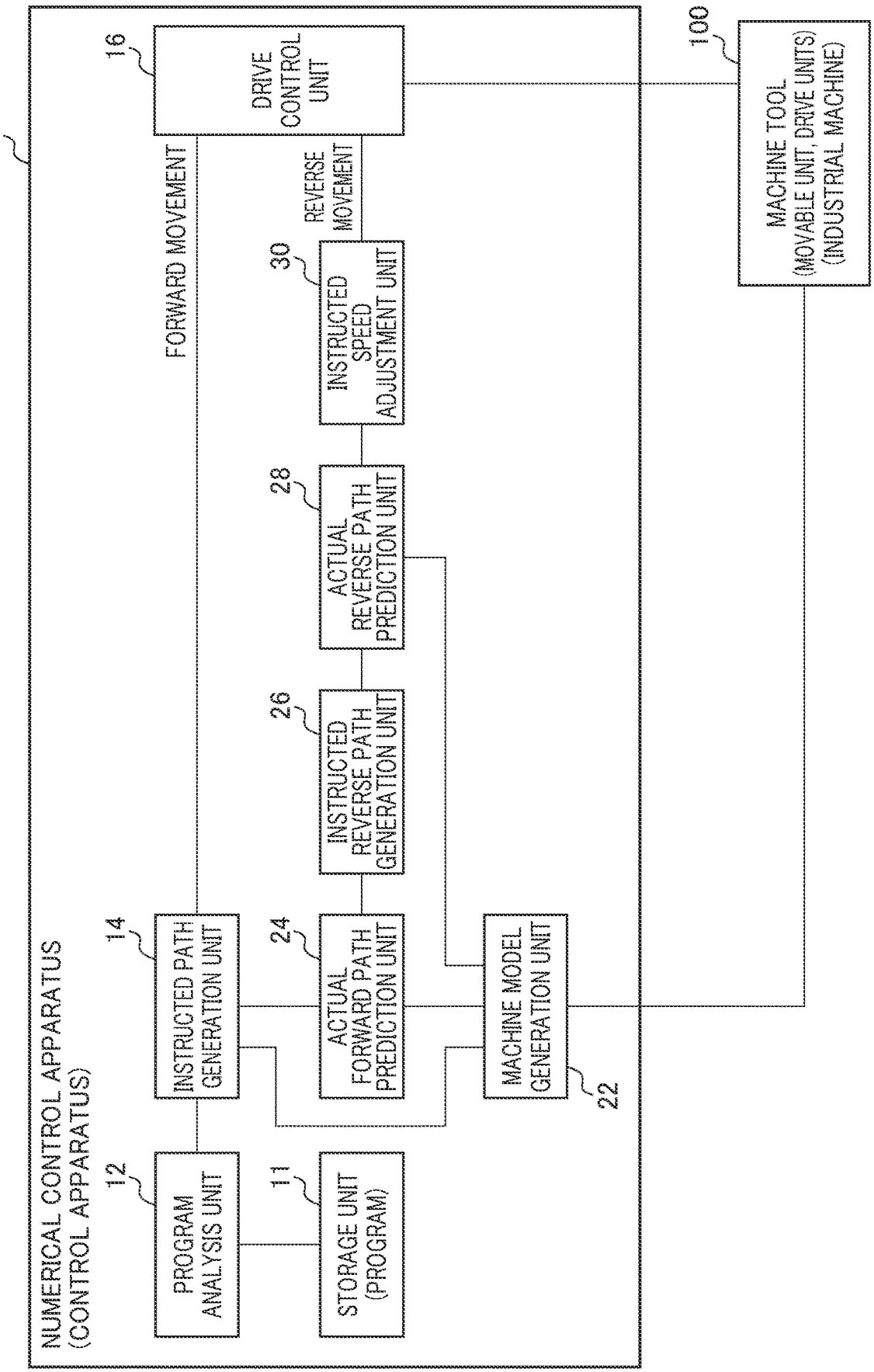
FIG. 1 is a diagram showing a configuration of a numerical control apparatus (a control apparatus) for a machine tool (an industrial machine) according to the present embodiment.

An example of an embodiment of the present invention will be described with reference to accompanying drawings. In the drawings, the same or corresponding portions will be given the same reference numerals.

FIG. 1 is a diagram showing a configuration of a numerical control apparatus (a control apparatus) for a machine tool (an industrial machine) according to the present embodiment. In FIG. 1, a machine tool 100 is also shown together with a numerical control apparatus 10.

The machine tool 100 includes a movable unit on which a tool or a workpiece is mounted, and drive units to drive the movable unit, such as servo motors. By driving the movable unit by the drive units, the machine tool 100 performs machining a workpiece while causing a tool to relatively move with respect to a workpiece.

By controlling the drive units (for example, servo motors) of the machine tool 100 based on a machining program (a program), the numerical control apparatus 10 controls movement of the movable unit of the machine tool 100. The numerical control apparatus 10 is provided with a storage unit 11, a program analysis unit 12, an instructed path generation unit 14, and a drive control unit 16.

The numerical control apparatus 10 (except the storage unit 11) is configured with an arithmetic processor, for example, a DSP (digital signal processor) or an FPGA (field-programmable gate array). Various kinds of functions of the numerical control apparatus 10 are realized, for example, by executing predetermined software (program) stored in the storage unit 11. The various kinds of functions of the numerical control apparatus 10 may be realized by cooperation between hardware and software or realized only by hardware (electronic circuits).

The storage unit 11 of the numerical control apparatus 10 is a rewritable memory, for example, an EEPROM. The storage unit 11 stores the predetermined software (program) for executing the various kinds of functions of the numerical control apparatus 10 described above. Further, the storage unit 11 stores, for example, a machining program inputted from outside. The processing program includes, for each block, an instruction about a movement path (for example, an amount of movement from a current position to an end position) of the movable unit of the machine tool 100, and an instruction about a movement speed (for example, a target maximum speed) of the movable unit: of the machine tool 100.

The program analysis unit 12 analyzes the machining program stored in the storage unit 11, and reads out the instructions for the movement path and the movement speed for each block.

The instructed path generation unit 14 generates an instructed path, which is a movement path obtained by interpolating points on the movement path in an interpolation cycle, based on the instruction about the movement path read out by the program analysis unit 12. Further, the instructed path generation unit 14 generates an instructed speed. (a movement speed pattern) based on the generated instructed path, acceleration/deceleration based on an acceleration/deceleration time constant, and an instruction about a maximum movement speed. The instructed path generation unit 14 generates the instructed speed (a movement speed pattern) for each of the drive units (for example, an X-axis servo motor, a Y-axis servo motor, and a Z-axis servo motor) of the machine tool 100.

By causing the drive units of the machine tool. 100 based on the instructed path and instructed speed (movement speed pattern) generated by the instructed path generation unit 14, the drive control unit 16 performs forward movement operation of causing the movable unit of the machine tool 100 to move along the instructed path. A plurality of drive control units 16 may be provided for the drive units (for example, the X-axis servo motor, the Y-axis servo motor, and the Z-axis servo motor) of the machine tool 100, respectively. The drive control unit 16 is, for example, a servo control unit, and performs drive control of the servo motors based on a position instruction based on the instructed path and the instructed speed. (a movement speed pattern) and position feedback detected by encoders provided for the servo motors.

If some trouble occurs at the time of causing the movable unit of the machine tool 100 to move along the instructed path, the movable unit may be returned by being caused to reversely move along the instructed path. For example, if the above problem is insufficient machining, it is conceivable to, after returning the movable unit by causing the movable unit to reversely move along the instructed path, cause the movable unit to move along the instructed path again and perform machining. In this case, if an actual forward path along the instructed path and an actual reverse path that is reverse to the instructed path are the same, the actual forward path and actual reverse path being an actual path that the movable unit actually pass through, it is possible to also perform machining at the time of causing the movable unit to reversely move along the instructed path and improve the machining efficiency.

Figure 2A:
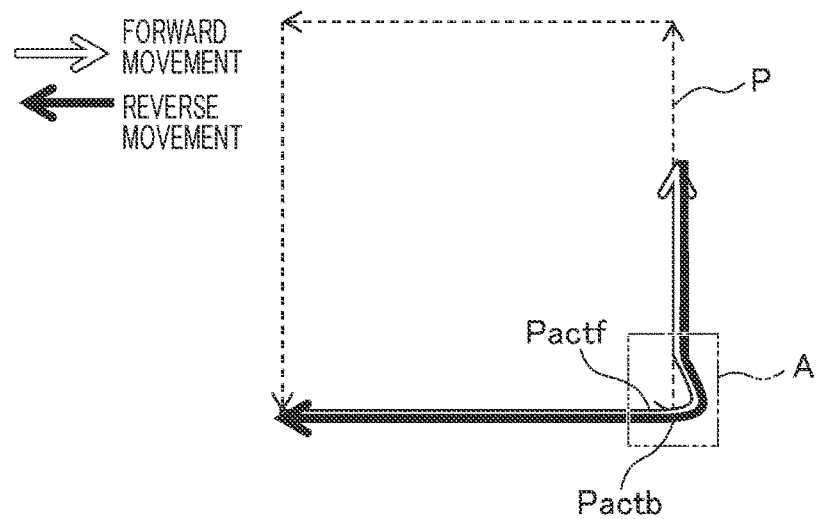
FIG. 2A is a diagram showing an example of an instructed path, an actual (forward) path, and an actual reverse path of the present embodiment.
Figure 2B:
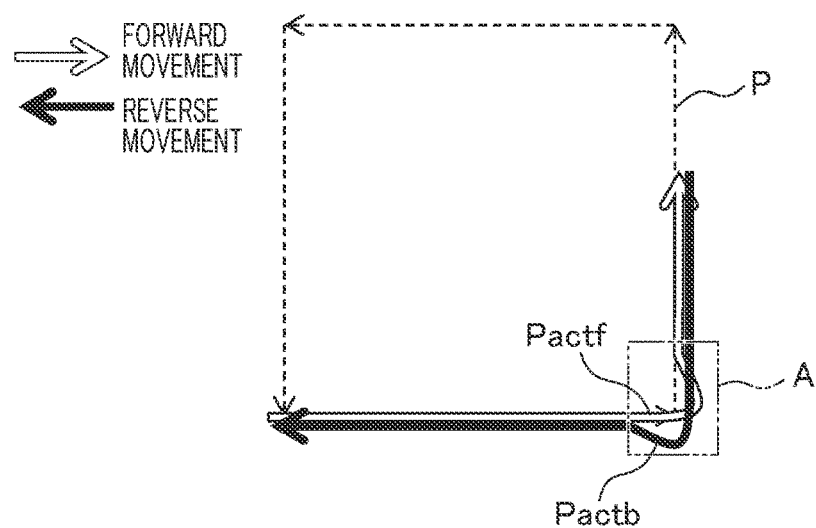
FIG. 2B is a diagram showing an example of a conventional instructed path, actual (forward) path, and actual reverse path.

If an instructed path P includes a non-linear path as shown in FIG. 2B (in the example of FIG. 2B, a part where the movement direction changes by 90 degrees), and an instructed speed is relatively fast, however, an actual path Pactf may deviate from the instructed path P on the non-linear path. More specifically, the actual path Pactf may take a detour in comparison with the instructed path P. In this case, a position of a detour on the actual forward path. Pactf and a position of a detour on an actual reverse path. Pactb may be different on the non-linear path, and, thereby, the actual forward path Pactf and the actual reverse path Pactb may deviate from each other.

It is due to influence of the transfer characteristic of the machine tool 100 that the actual path Pactf takes a detour in comparison with the instructed path P. Therefore, it is devised to reduce the deviation between the actual forward path Pactf and the actual reverse path Pactb by generating a reverse movement instruction in consideration of the transfer characteristic of the machine tool 100 as shown in FIG. 2A.

Therefore, in the present embodiment, the numerical control apparatus 10 is further provided with a machine model generation unit 22, an actual forward path prediction unit 24, an instructed reverse path generation unit 26, an actual reverse path prediction unit 28, and an instructed speed adjustment unit 30.

The machine model generation unit 22 performs system identification based on the transfer characteristic of the machine tool 100, more specifically, transfer characteristics of the drive units and the movable unit of the machine tool 100 to generate a machine model. As a method for the system identification, any of various well-known methods can be used. Description will be made below on an example of the case of generating a state-space model based on the frequency characteristic which is the transfer characteristic (as the system identification method, a well-known prediction error method, a correlation method, or the like can be used).

The machine model generation unit 22 acquires the frequency characteristic, which are the transfer characteristic of the machine tool 100, in advance. The machine model generation unit 22 performs system identification based on the frequency characteristic, which is the transfer characteristic of the machine tool 100, to generate the following state-space model.

$$x[t+1]=Ax[t]+Bu[t]$$

$$y[t]=Cx[t]+Du[t]$$

Here, A, B, C, and D is coefficients of a state-space matrix; x[t] is a state vector; u[t] is an input vector; and y[t] is an output vector.

In this state-space model, by giving locus data l[t] obtained by sampling the instructed path P as the input vector u[t], actual locus data lact[t] of the actual path Pactf is obtained as the output vector y[t]. Thereby, the machine model generation unit 22 generates the following machine model.

$$x[t+1]Ax[t]+Bl[t]$$

$$\text{lact}[t]=Cx[t]+Dl[t]$$

Description will be made below, with attention being paid on a range A which is a non-linear part A in FIGS. 2A and 2B where an error between the actual forward path Pactf and the actual reverse path Pactb occurs.

Figure 3A:
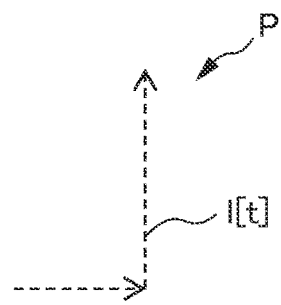
FIG. 3A is a diagram showing an example of the instructed path in a non-linear part A in FIG. 2A and locus data thereof.
Figure 3B:
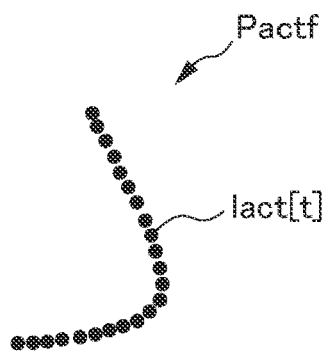
FIG. 3B is a diagram showing an example of the actual forward path in the non-linear part A in FIG. 2A and actual locus data thereof.
Figure 3C:
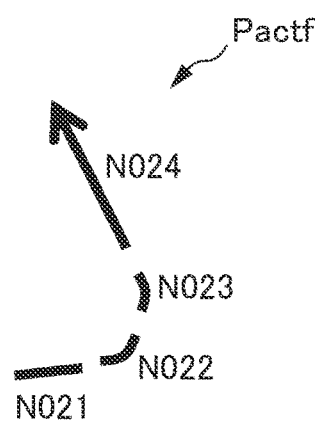
FIG. 3D is a diagram showing an example of an instructed reverse path in the non-linear part A in FIG. 2A.

The actual forward path prediction unit 24 predicts an actual forward path from an instructed path using the machine model described above. For example, consideration will be made on an instructed path P on the non-linear path the movement direction of which changes by 90 degrees as shown in FIGS. 2A and 3A. Locus data obtained by sampling the instructed path P at time t is denoted by l[t]. As shown in FIG. 3B, the actual forward path prediction unit 24 predicts the actual locus data lact[t] of the actual forward path Pactf from the locus data l[t] of the instructed path P, using the machine model described above. Then, as shown in FIG. 3C, the actual forward path prediction unit 24 combines the actual locus data lact[t] for each of blocks (NO21 to PO24) to predict the actual forward path Pactf.

Figure 3D:
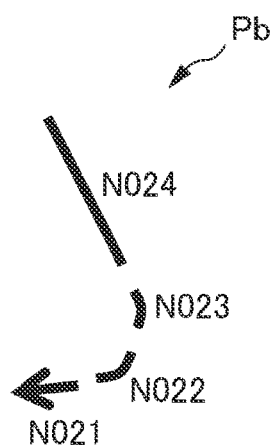

As shown in FIG. 3D, the instructed reverse path generation unit 26 generates an instructed reverse path Pb (blocks: NO21 to NO24) by reversing the movement direction of the actual forward path Pactf.

Here, if an instructed speed is relatively fast, the actual reverse path Pactb may also deviate from the instructed reverse path Pb on the non-linear path. More specifically, the actual reverse path Pactb may take a detour in comparison with the instructed reverse path. Pb.

Figure 4A:
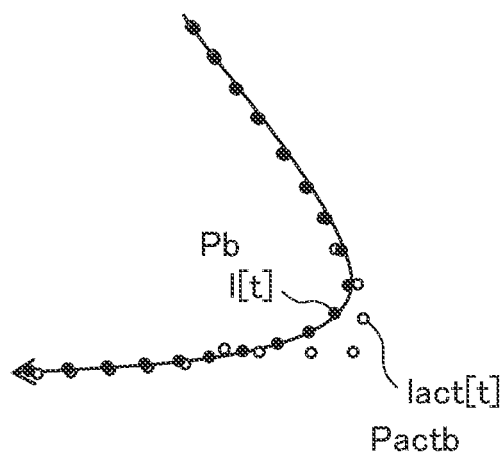
FIG. 4A is a diagram showing an example of the instructed reverse path and the actual reverse path in the non-linear part A in FIG. 2A.

Therefore, the actual reverse path prediction unit 28 predicts the actual reverse path from the instructed reverse path using the machine model described above. For example, as shown in FIG. 4I, locus data obtained by sampling the instructed reverse path Pb is denoted by l[t]. As shown in FIG. 4I, the actual reverse path prediction unit 28 predicts the actual locus data lact[t] of the actual reverse path Pactb from the locus data l[t] of the instructed reverse path Pb, using the machine model described above.

The instructed speed adjustment unit 30 adjusts an acceleration/deceleration time constant of the instructed speed (a movement speed pattern) so as to reduce the error of the actual reverse path Pactb with respect to the instructed reverse path Pb, and generates an instructed reverse speed. For each of the drive units (for example, the X-axis servo motor, the Y-axis servo motor, and the Z-axis servo motor) of the machine tool 100, the instructed speed adjustment unit 30 generates the instructed reverse speed. (a movement speed pattern) that is the instructed speed (a movement speed pattern) that has been adjusted.

Figure 4B:
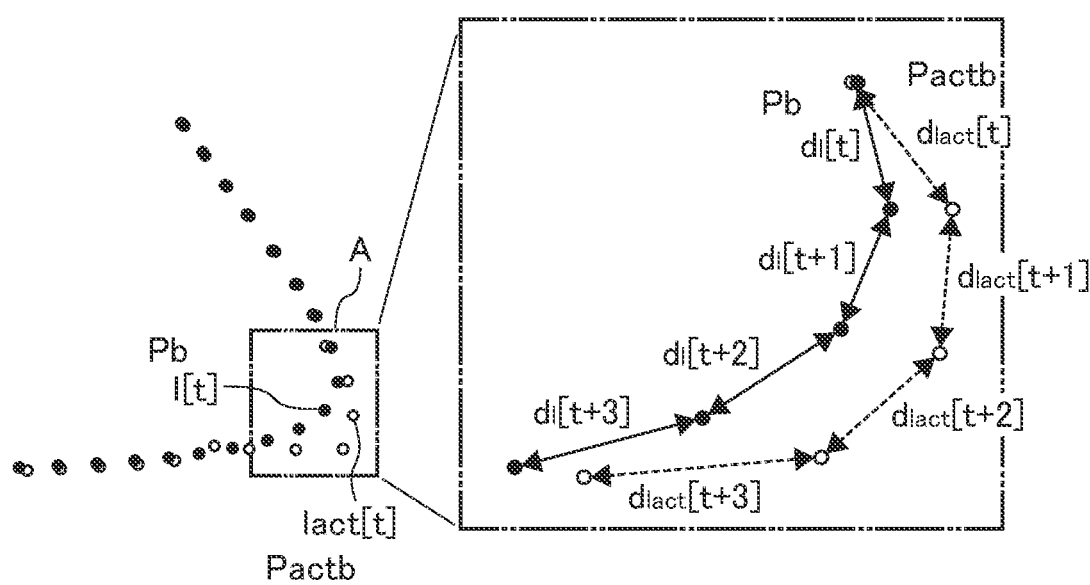
FIG. 4B is a diagram enlargingly showing a range A where an error between the instructed reverse path and the actual reverse path occurs in FIG. 4A.

It is assumed that, for example, as shown in FIG. 4B, the instructed reverse path Pb includes a plurality of pieces of locus data l[t] obtained by sampling the instructed reverse path Pb in the t. Further, it is assumed that the actual reverse path Pactb includes a plurality of pieces of actual locus data lact[t] corresponding to the plurality of pieces of locus data l[t] of the instructed reverse path pb, respectively.

The instructed speed adjustment unit 30
- calculates Euclidean distances $d_l[t]$ among the pieces of locus data l[t] of the instructed reverse path Pb, and Euclidean distances $d_{lact}[t]$ among the pieces of actual locus data lace [t] of the actual reverse path Pactb;
- calculates a movement amount difference from a sum total of the Euclidean distances $d_l[t]$ of the instructed reverse path Pb and a sum total of the Euclidean distances $d_{lact}[t]$ of the actual reverse path Pactb in the range A where errors of the pieces of actual locus data lact[t] of the actual reverse path. Pactb with respect to the pieces of locus data l[t] of the instructed reverse path. Pb are equal to or larger than a predetermined value;
- calculates an adjusted acceleration/deceleration time constant τ a by Formula (1) below based on the movement amount difference, and a maximum speed v and the acceleration/deceleration time constant τ of the instructed speed (a movement speed pattern); and
- generates the instructed reverse speed (a movement speed pattern) for which the acceleration/deceleration time constant τ of the instructed speed (a movement speed pattern) in a block immediately before a block that includes the range A where the errors of the pieces of actual locus data lact[t] of the actual reverse path Pactb with respect to the pieces of locus data l[t] of the instructed reverse path Pb are equal to or larger than the predetermined value is adjusted to the adjusted acceleration/deceleration time constant τa as shown in FIG. 4C.

[Formula 1]

$$\tau_a = \tau + \frac{\sum_{k=0}^{n} d_{lact}[t+i] - \sum_{k=0}^{n} d_l[t+i]}{v} \quad (1)$$

Here, i is an increment variable, n is a maximum value of the increment variable and represents the number of pieces of locus data in the range A.

For example, in FIG. 4C, when a horizontal direction and a vertical direction are indicated by the X axis and the Y axis, the movable unit moves diagonally downward to the right at a composite speed of the speed of the X-axis servo motor and the speed of the Y-axis motor. Here, when the acceleration/deceleration time constant of each axis increases, the time of movement at the composite speed becomes shorter, and change in speed until the composite speed is reached becomes gradual. That is, when the relationship of $\Sigma d_l < \Sigma d_{lact}$ is satisfied, adjustment is performed so that the acceleration/deceleration time constants of the servo motors of both axes increase. Thereby, acceleration/deceleration becomes gradual, and a detour of the actual reverse movement locus is prevented or reduced (the followability of the servo motors increases as acceleration/deceleration becomes gradual).

For example, in response to an instruction to perform reverse movement operation, the drive control unit 16 performs reverse movement operation of causing the movable unit of the machine tool 100 to reversely move along the instructed path, by causing the drive units of the machine tool 100 based on the instructed reverse path generated by the instructed reverse path generation unit 26 and the instructed reverse speed (a movement speed pattern) adjusted by the instructed speed adjustment unit 30. The drive control unit 16 performs drive control of the servo motors, for example, based on a position instruction based on the instructed reverse path and the instructed reverse speed (a movement speed pattern), and position feedback detected by the encoders provided for the servo motors.

As described above, according to the numerical control apparatus 10 for a machine tool according to the present embodiment, an actual forward path is predicted from an instructed path, using a machine model associated with the transfer characteristic of the machine tool 100;

an instructed reverse path is generated from the predicted actual forward path;

an actual reverse path is predicted from the in reverse path, using the machine model; and an instructed reverse speed is generated by adjusting an instructed speed (a movement speed pattern) so as to reduce an error between the instructed reverse path and the predicted actual reverse path, in other words, so that the actual reverse path is close to the instructed reverse path, and, therefore, it is possible to reduce a deviation between the actual forward path and the actual reverse path of the movable unit of the machine tool 100. Thereby, it is possible to perform machining even at the time of causing the movable unit to reversely move along the instructed path, and improve the machining efficiency. Further, it is possible to improve the machining accuracy at the time of performing reciprocating machining as described above.

(Modification 1)

In the embodiment described above, the instructed speed adjustment unit 30 generates the instructed reverse speed (the movement speed pattern) for which the acceleration/deceleration time constant τ of the instructed speed (a movement speed pattern) is adjusted to the adjusted acceleration/deceleration time constant τa so as to reduce the error of the actual reverse path Pactb with respect to the instructed reverse path Pb. In comparison, in Modification 1, the instructed speed adjustment unit 30 may generate the instructed reverse speed (a movement speed pattern) for which the maximum speed v of the instructed speed (a movement speed pattern) is adjusted to the adjusted maximum speed va so as to reduce the error of the actual reverse path Pactb with respect to the instructed reverse path Pb.

Figure 5A:
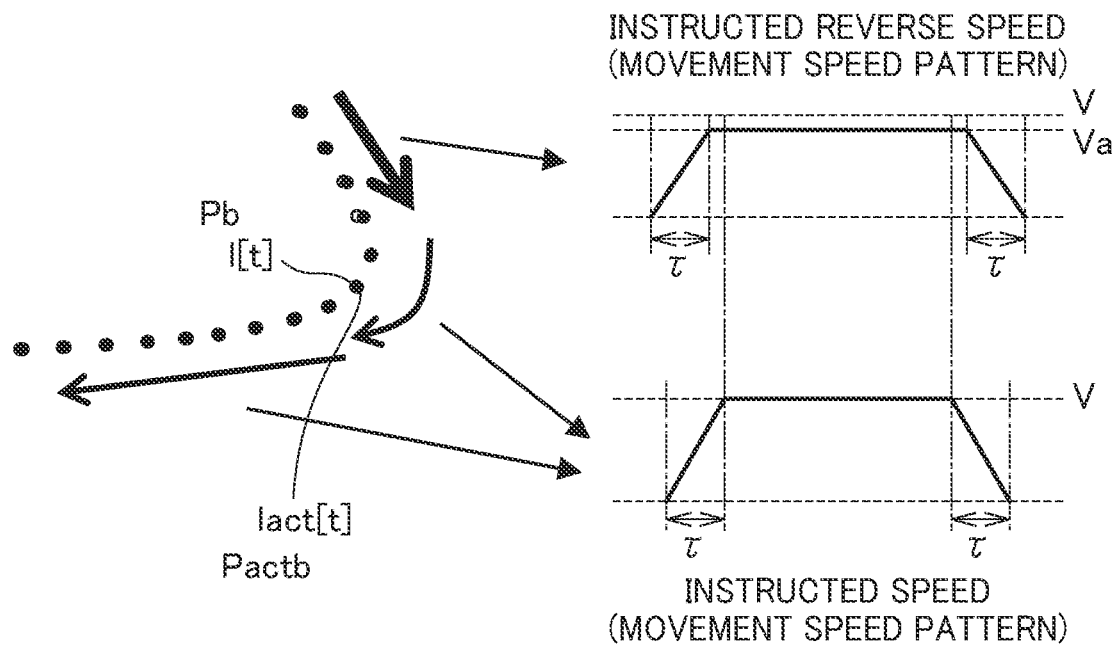
FIG. 5A is a diagram showing an example of an instructed reverse speed of a modification.

The instructed speed adjustment unit 30 calculates the Euclidean distances $d_l[t]$ among the pieces of locus data $l[t]$ of the instructed reverse path Pb, and the Euclidean distances $d_{lact}[t]$ among the pieces of actual locus data lact[t] of the actual reverse path Pactb, similarly to the above;

calculates a deceleration rate from the sum total of the Euclidean distances $d_l[t]$ of the instructed reverse path. Pb and the sum total of the Euclidean distances $d_{lact}[t]$ of the actual reverse path Pactb in the range A where the errors of the pieces of actual locus data lact[t] of the actual reverse path Pactb with respect to the pieces of locus data l[t] of the instructed reverse path Pb are equal to or larger than the predetermined value;

calculates the adjusted maximum speed va by Formula (2) below for multiplying the maximum speed v of the instructed speed (a movement speed pattern) by the deceleration rate;

generates the instructed reverse speed (a movement speed pattern) for which the maximum speed v of the instructed speed (a movement speed pattern) in the block immediately before the block that includes the range A where the errors of the pieces of actual locus data lact[t] of the actual reverse path Pactb with respect to the pieces of locus data l[t] of the instructed reverse path Pb are equal to or larger than the predetermined value is adjusted to the adjusted maximum speed va as shown in FIG. 5A.

[Formula 2]

$$v_a = v \times \frac{\sum_{k=0}^{n} d_l[t+i]}{\sum_{k=0}^{n} d_l[t+i] + \sum_{k=0}^{n} d_{lact}[t+i]} \quad (2)$$

Here, i is an increment variable, n is a maximum value of the increment variable and represents the number of pieces of locus data in the range A.

For example, in FIG. 5A, when a horizontal direction and a vertical direction are indicated by the X axis and the Y axis, the movable unit moves diagonally downward to the right at a composite speed of the speed of the X-axis servo motor and the speed of the Y-axis motor. Here, as the error between the instructed reverse path and the actual reverse path increases, the maximum speed decreases. That is, in the relationship of $\Sigma d_l < \Sigma d_{lact}$, as the difference therebetween increases, the value of the adjusted maximum speed va decreases. Thereby, the detour of the actual reverse movement locus is prevented or reduced.

(Modification 2)

In Modification 1 described above, the instructed speed adjustment unit 30 calculates the deceleration rate of the maximum speed v of the instructed speed. (a movement speed pattern) from the sum total of the Euclidean distances $d_l[t]$ of the instructed reverse path Pb and the sum total of the Euclidean distances $d_{lact}[t]$ of the actual reverse path Pactb. In comparison, in Modification 2, the deceleration rate may be calculated from. Euclidean distances $d_{err}[t+k]$ of maximum errors at a point i=k at which Euclidean distances $d_{err}=[t]$ of the errors of the pieces of actual locus data lact[t] of the actual reverse path Pactb with respect to the pieces of locus data l[t] of the instructed reverse path Pb are maximized, and Euclidean distances $d_l[t+k]$ of the instructed reverse path Pb corresponding thereto.

Figure 5B:
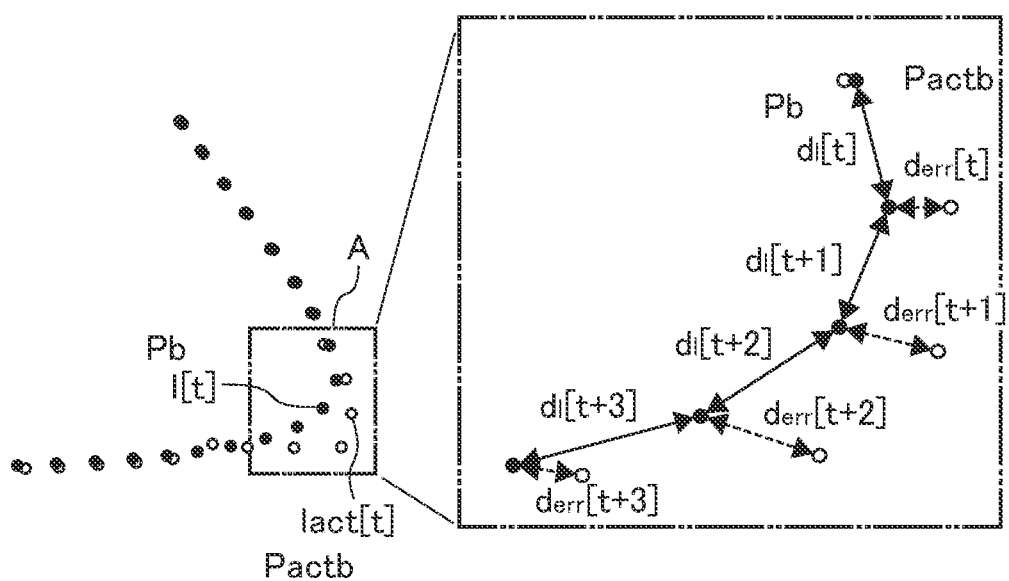
FIG. 5B is a diagram enlargingly showing the range A where the error between the instructed reverse path and the actual reverse path occurs in FIG. 4A.

The instructed speed adjustment unit 30 calculates the Euclidean distances $d_l[t]$ among the pieces of locus data l[t] of the instructed reverse path. Pb, and the Euclidean distances $d_{err}[t]$ of the errors between the pieces of locus data l[t] of the instructed reverse path Pb and the pieces of actual locus data lact[t] of the actual reverse path Pactb, as shown in FIG. 5B;

determines a point i=k at which the Euclidean distances $d_{err}[t]$ of errors that occur in the same direction are maximized in the range A where the errors of the pieces of actual locus data lact[t] of the actual reverse path Pactb with respect to the pieces of locus data l[t] of the instructed reverse path Pb are equal to or larger than the predetermined value (in the example of FIG. 5B, i=k=2);

calculates the deceleration rate front the distances $d_{err}[t+]$ of the maximum errors and Euclidean distance $d_l[t+k]$ of the instructed reverse path Pb corresponding thereto;

calculates the adjusted maximum speed va by Formula (3) below for multiplying the maximum speed v of the instructed speed (a movement speed pattern) by the deceleration rate;

generates the instructed reverse speed (a movement speed pattern) for which the maximum speed v of the in speed (a movement speed pattern) in a block that includes locus data immediately before a direction of the errors of the pieces of locus data lact[t] of the actual reverse path Pactb with respect to the pieces of locus data l[t] of the instructed reverse path Pb are reversed is adjusted to the adjusted maximum speed va, as shown in FIG. 5A.

[Formula 3]

$$v_a = v \times \frac{d_l[t+k]}{d_l[t+k] + d_{err}[t+k]} \quad (3)$$

Here, i is an increment variable, n is a maximum value of the increment variable and represents the number of pieces of locus data in the range A. Further, 0≤k(i)≤n is satisfied.

In Modification 2, advantages similar to those of Modification 1 described above can be obtained.

According to the numerical control apparatus 10 of the embodiment and the modifications described above, the following effects can be obtained.

In such a machine tool that repeatedly perform machining of the same path, accuracies of forward movement and reverse movement are the same.

It is possible to return and perform machining in the middle of the program.

It is possible to, in a case where some problem occurs, cause a tool to reversely move without evacuating the tool. For example, even in a situation in which the tool cannot be freely moved, it is possible to return the tool by causing the tool to reversely move along the path on which it has moved forward, without evacuating the tool.

Examples of machine tools to which the numerical control apparatus 10 of the embodiment and the modifications described above is preferably applicable will be exemplified below.

(Cutting Machining)

Figure 6:
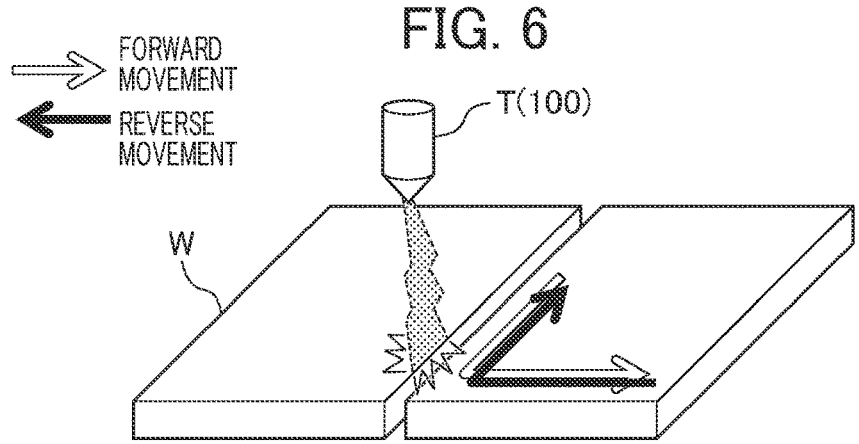
FIG. 6 is a diagram showing an example of cutting machining by a plasma machining machine or a gas cutting machine.

FIG. 6 is a diagram showing an example of cutting machining by a plasma machining machine or a gas cutting machine. FIG. 6 shows a cutting machine T mounted on a movable unit of a plasma machine tool or gas cutting machine to perform cutting machining of a workpiece W. In cutting machining by such a plasma machining machine or gas cutting machine, there may be a case where the workpiece W cannot be cut by performing forward machining once. In such a case, it is possible to perform reverse direction machining at the time of returning the cutting machine T by causing the cutting machine T to reversely move, and improve the machining efficiency. Further, even in the case of a machining path that includes a non-linear path (for example, a corner part), it is possible to improve the machining accuracy at the time of performing reciprocating machining.

(Welding Machining)

Figure 7:
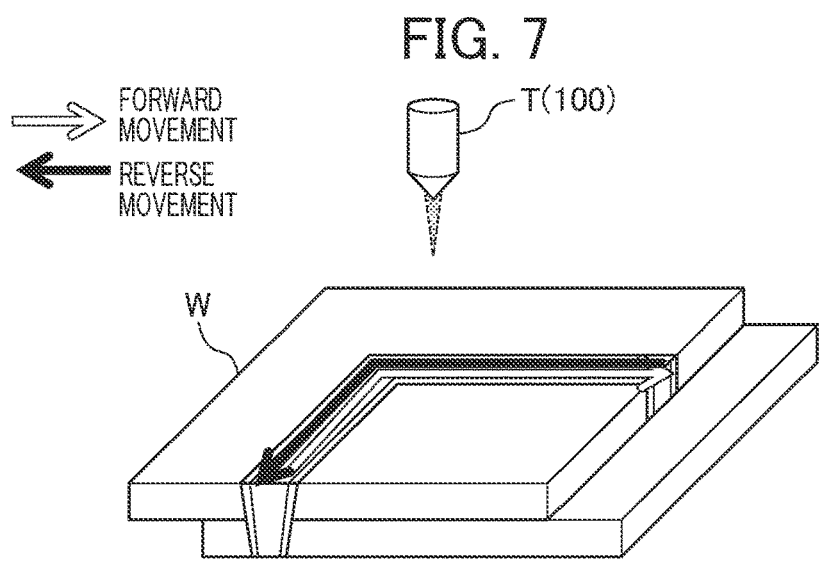
FIG. 7 is a diagram showing an example of welding machining by a laser machining machine.

FIG. 7 is a diagram showing an example of welding machining by a laser machining machine. FIG. 7 shows a laser T mounted on a movable unit of a laser machining machine to perform welding machining of a workpiece W. In welding machining by such a laser machining machine, there may be a case where welding machining is performed at a welding position of the workpiece W twice or more times in order to increase the strength of a joint position of the workpiece W. In such a case, it is possible to perform reverse direction machining at the time of returning the laser T by causing the laser T to reversely move, and improve the machining efficiency. Further, even in the case of a machining path that includes a non-linear path (for example, a corner part), it is possible to improve the machining accuracy at the time of performing reciprocating machining.

(Laser Forming Machining)

Figure 8:
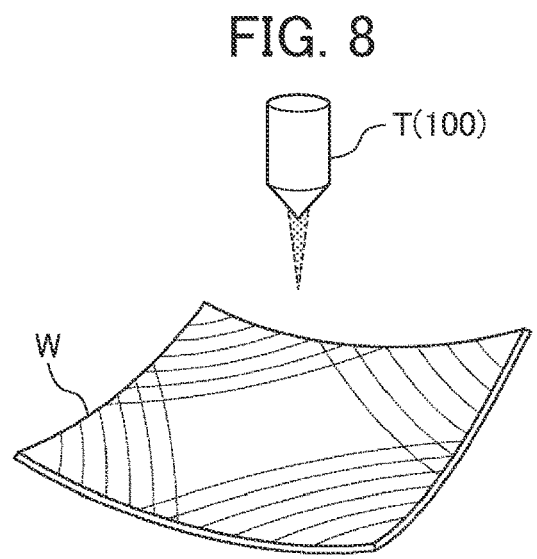
FIG. 8 is a diagram showing an example of laser forming machining by a laser machining machine.

FIG. 8 is a diagram showing an example of laser forming machining by a laser machining machine. FIG. 8 shows a laser T mounted on a movable unit of a laser machining machine to perform laser forming (bending) machining of a workpiece W. The laser forming machining by the laser machining machine has a characteristic that, as the number of times of irradiation of a laser light on the same machining position on the workpiece W increases, the bending angle of a machining position of the workpiece W increases. In such laser forming machining by the laser machining machine, it is possible to perform reverse direction machining at the time of returning the laser T by causing the laser T to reversely move, in addition to forward machining of the laser T, and improve the machining efficiency.

In the laser forming machining by the laser machining machine, there may be a case where a laser light irradiation path for machining the workpiece W into a three-dimensional shape includes not only a linear path but also a complicated non-linear path. Even for a machining path that includes such a complicated non-linear path, it is also possible to improve the machining accuracy at the time of performing reciprocating machining.

An embodiment of the present invention has been described above. The present invention, however, is not limited to the embodiment described above, but various changes and modifications are possible. For example, in the embodiment described above, description has been made on a numerical control apparatus for a machine tool, which controls movement of drive units of the machine tool based on a machining program to relatively move a tool with respect to a workpiece to perform machining of the workpiece. The characteristics of the present invention, however, are not limited thereto, but are applicable to various control apparatuses for various industrial machines, such as a robot, which control movement of drive units of the industrial machines based on programs.

EXPLANATION OF REFERENCE NUMERALS

10 Numerical control apparatus (control apparatus)
11 Storage unit (program)
12 Program analysis unit
14 Instructed path generation unit
16 Drive control unit
22 Machine model generation unit
24 Actual forward path prediction unit.
26 Instructed reverse path generation unit 28 Actual reverse path prediction unit
30 Instructed speed adjustment unit
100 Machine tool (movable unit, drive units) (industrial machine)

The invention claimed is:

1. A control apparatus for controlling movement of a movable unit of an industrial machine based on a program, the program including, for each block, an instruction about a movement path of the movable unit and an instruction about a movement speed of the movable unit, the control apparatus comprising:
an instructed path generation unit configured to generate an instructed path for the movement path of the movable unit based on an instruction from the program;
a drive control unit configured to control a drive unit that drives the movable unit, the drive control unit being capable of performing forward movement operation of causing the movable unit to move along the instructed path, based on the instructed path generated by the instructed path generation unit and an instructed speed based on the movement speed indicated by the instruction from the program, and reverse movement operation of causing the movable unit to reversely move along the instructed path, based on an instructed reverse path and an instructed reverse speed;
an actual forward path prediction unit configured to predict an actual forward path from the instructed path, using a machine model associated with a transfer characteristic of the industrial machine;
an instructed reverse path generation unit configured to generate the instructed reverse path by reversing a movement direction of the actual forward path;
an actual reverse path prediction unit configured to predict an actual reverse path from the instructed reverse path, using the machine model; and
an instructed speed adjustment unit configured to adjust an instructed speed based on the movement speed indicated by the instruction from the program so as to reduce an error of the actual reverse path with respect to the instructed reverse path, and generate the instructed reverse speed.

2. The control apparatus for the industrial machine according to claim 1, further comprising:
a machine model generation unit configured to perform system identification based on the transfer characteristic of the industrial machine to generate the machine model.

3. The control apparatus for the industrial machine according to claim 1, wherein
the instructed speed adjustment unit adjusts an acceleration/deceleration time constant of the instructed speed.

4. The control apparatus for the industrial machine according to claim 3, wherein
the instructed reverse path includes a plurality of pieces of locus data obtained by sampling the instructed reverse path at time t,
the actual reverse path includes a plurality of pieces of actual locus data corresponding to the plurality of pieces of locus data of the instructed reverse path, respectively,
the instructed speed adjustment unit
calculates Euclidean distances $d_l[t]$ between the pieces of locus data of the instructed reverse path, and Euclidean distances $d_{lact}[t]$ between the pieces of actual locus data of the actual reverse path,
calculates a movement amount difference from a sum total of the Euclidean distances $d_l[t]$ of the instructed reverse path and a sum total of the Euclidean distances $d_{lact}[t]$ of the actual reverse path in a range where errors of the pieces of actual locus data of the actual reverse path with respect to the pieces of locus data of the instructed reverse path are equal to or larger than a predetermined value,
calculates an adjusted acceleration/deceleration time constant τa by Formula (1) below that is based on the movement amount difference, and a maximum speed v and an acceleration/deceleration time constant t of the instructed speed, and
generates the instructed reverse speed for which the acceleration/deceleration time constant τ of the instructed speed in a block immediately before a block that includes the range where the errors of the pieces of actual locus data of the actual reverse path with respect to the pieces of locus data of the instructed reverse path are equal to or larger than the predetermined value is adjusted to the adjusted acceleration/deceleration time constant τa;

[Formula 1]

$$\tau_a = \tau + \frac{\sum_{k=0}^{n} d_{lact}[t+i] - \sum_{k=0}^{n} d_l[t+i]}{v} \quad (1)$$

where i is an increment variable, and n is a maximum value of the increment variable.

5. The control apparatus for the industrial machine according to claim 1, wherein
the instructed speed adjustment unit adjusts a maximum speed of the instructed speed.

6. The control apparatus for the industrial machine according to claim 5, wherein
the instructed reverse path includes a plurality of pieces of locus data obtained by sampling the instructed reverse path at time t,
the actual reverse path includes a plurality of pieces of actual locus data corresponding to the plurality of pieces of locus data of the instructed reverse path, respectively,
the instructed speed adjustment unit
calculates Euclidean distances $d_l[t]$ between the pieces of locus data of the instructed reverse path, and Euclidean distances $d_{lact}[t]$ between the pieces of actual locus data of the actual reverse path,
calculates a deceleration rate from a sum total of the Euclidean distances $d_l[t]$ of the instructed reverse path and a sum total of the Euclidean distances $d_{lact}[t]$ of the actual reverse path in a range where errors of the pieces of actual locus data of the actual reverse path with respect to the pieces of locus data of the instructed reverse path are equal to or larger than a predetermined value,
calculates an adjusted maximum speed va by Formula (2) below for multiplying a maximum speed v of the instructed speed by the deceleration rate, and
generates the instructed reverse speed for which the maximum speed v of the instructed speed in a block immediately before a block that includes the range where the errors of the pieces of actual locus data of the actual reverse path with respect to the pieces of locus data of the instructed reverse path are equal to or larger than the predetermined value is adjusted to the adjusted maximum speed va;

[Formula 2]

$$v_a = v \times \frac{\sum_{i=0}^{n} d_l[t+i]}{\sum_{i=0}^{n} d_l[t+i] + \sum_{i=0}^{n} d_{lact}[t+i]} \quad (2)$$

where i is an increment variable, and n is a maximum value of the increment variable.

7. The control apparatus for the industrial machine according to claim 5, wherein the instructed reverse path includes a plurality of pieces of locus data obtained by sampling the instructed reverse path at time t, the actual reverse path includes a plurality of pieces of actual locus data corresponding to the plurality of pieces of locus data of the instructed reverse path, respectively, the instructed speed adjustment unit calculates Euclidean distances $d_l[t]$ between the pieces of locus data of the instructed reverse path, and Euclidean distances $d_{err}[t]$ of errors between the pieces of locus data of the instructed reverse path and the pieces of actual locus data of the actual reverse path, determines a point i=k at which Euclidean distances $d_{err}[t]$ of errors that occur in a same direction are maximized in a range where errors of the pieces of actual locus data of the actual reverse path with respect to the pieces of locus data of the instructed reverse path are equal to or larger than a predetermined value, calculates a deceleration rate from Euclidean distance $d_{err}[t+k]$ of a maximum error and Euclidean distance $d_l[t+k]$ of the instructed reverse path corresponding thereto;

calculates an adjusted maximum speed va by Formula (3) below for multiplying a maximum speed v of the instructed speed by the deceleration rate, and generates the instructed reverse speed for which the maximum speed v of the instructed speed in a block that includes locus data immediately before a direction of the errors of the pieces of locus data of the actual reverse path with respect to the pieces of locus data of the instructed reverse path is reversed is adjusted to the adjusted maximum speed va,

[Formula 3]

$$v_a = v \times \frac{d_l[t+k]}{d_l[t+k] + d_{err}[t+k]} \quad (3)$$

where i is an increment variable, n is a maximum value of the increment variable, and k satisfies 0≤k≤n.

* * * * *